United States Patent Office 3,483,180
Patented Dec. 9, 1969

3,483,180
WATER-INSOLUBLE MONOAZO DYESTUFFS CONTAINING N-BENZYL-N-CYANOETHYL GROUPS
Visvanathan Ramanathan, Basel, Switzerland, assignor to Ciba Limited, Basel, Switzerland, a company of Switzerland
No Drawing. Filed Oct. 18, 1965, Ser. No. 497,556
Claims priority, application Switzerland, Oct. 23, 1964, 13,758/64
Int. Cl. C09b 29/08, 29/36
U.S. Cl. 260—158                               8 Claims

ABSTRACT OF THE DISCLOSURE

Monoazo dyestuffs of the formula

A—N=N—B in which A represents a benzene radical or a heterocyclic radical and B represents a benzene radical containing an amino group in para-position to the azo group, the hydrogen atoms of the said amino group being substituted by an aralkyl radical free from basic groups and by a cyanoalkyl group dye polyester fibers orange to violet shades of good fastness to light and excellent fastness to sublimation.

---

The present invention provides valuable water-in-soluble monoazo dyestuffs of the formula

A—N=N—B in which A represents a benzene radical or a heterocyclic radical and B represents a benzene radical containing an amino group in para-position to the azo group, the hydrogen atoms of the said amino group being substituted by an aralkyl radical free from basic groups and by a cyanoalkyl, carbalkoxyalkyl, carbamidoalkyl or cyanoalkoxyalkyl group.

Dyestuffs of special interest are those of the formula

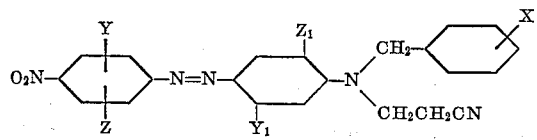

in which Y represents a hydrogen or halogen atom, or an alkyl, alkoxy, nitro, cyano, or a carbalkoxy group, Z represents a hydrogen or halogen atom or an alkyl, cyano or trifluoromethyl group, X represents a hydrogen or halogen atom or an alkyl or alkoxy group, $Y_1$ represents a hydrogen or halogen atom or an alkyl, alkoxy or acylamino group and $Z_1$ represents a hydrogen atom or an alkoxy group.

More particularly, these are monoazo-dyestuffs of the formula

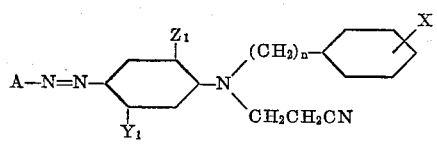

in which $Z_1$ represents a hydrogen atom or an alkoxy group having 1–2 carbon atoms, $Y_1$ represents hydrogen, chlorine or bromine or alkyl or alkoxy having 1–2 carbon atoms or lower alkanoylamino, X represents hydrogen or halogen or alkyl or alkoxy having 1–2 carbon atoms, $n$ represents the number 1 or 2, A is a member selected from the group consisting of the radicals of the formulae

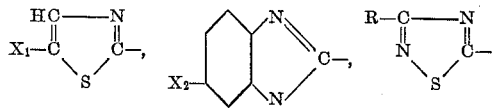

and

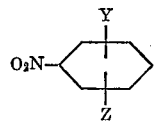

in which formulae $X_1$ represents hydrogen, nitro or cyano, $X_2$ represents methylsulfonyl, ethoxy, cyano or nitro, R represents methyl or phenyl, Y represents hydrogen or halogen or lower alkyl, lower alkoxy, nitro, cyano, carbolower alkoxy or lower alkylsulfone, Z represents hydrogen, chlorine, bromine or lower alkyl, cyano or trifluoromethyl.

The new dyestuffs may be obtained by coupling a diazo compound of an aminobenzene or a heterocyclic amine with an aminobenzene whose hydrogen atoms of the amino group are substituted by an aralkyl radical free from basic groups and by a cyanoalkyl, carbalkoxyalkyl, carbamidoalkyl or cyanoalkoxyalkyl group.

The diazo components used are preferably aminobenzenes of the formula

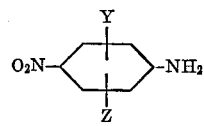

in which Y and Z have the meanings given above.

The following amines may be mentioned as examples:

aniline,
1-amino-4-chlorobenzene,
1-amino-4-bromo-benzene,
1-amino-4-methylbenzene,
1-amino-4-nitrobenzene,
1-amino-4-cyanobenzene,
1-amino-2,5-dicyanobenzene,
1-amino-4-methylsulfonylbenzene,
1-amino-4-carbalkoxybenzene,
1-amino-2,4-dichlorobenzene,
1-amino-2,4-dibromobenzene,
1-amino-2-methyl-4-chlorobenzene,
1-amino-2-trifluromethyl-4-chlorobenzene,
1-amino-2-cyano-4-chlorobenzene,
1-amino-2-carbomethoxy-4-chlorobenzene,
1-amino-2-carbomethoxy-4-nitrobenzene,
1-amino-2-chloro-4-cyanobenzene,
1-amino-2-chloro-4-nitrobenzene,
1-amino-2-chloro-4-carbethoxybenzene,
1-amino-2-chloro-4-methylsulfonylbenzene,
1-amino-2-methylsulfonyl-4-chlorobenzene,
1-amino-2-methylsulfonyl-4-nitrobenzene,
1-amino-2,4-dinitrobenzene,
1-amino-2,4-dicyanobenzene,
1-amino-2-cyano-4-methylsulfonylbenzene,
1-amino-2,6-dichloro-4-cyanobenzene,
1-amino-2,6-dichloro-4-nitrobenzene,
1-amino-2,4-dicyano-6-chlorobenzene,
1-amino-2,4-dinitro-6-chlorobenzene
   and especially
1-amino-2-cyano-4-nitrobenzene 1-amino-2-cyano-4-nitrobenzene is of particular interest.

A heterocyclic diazo component that is worthy of special mention is 2-amino-5-nitrothiazole; others that may be used are as follows:

2 - aminothiazole, 2 - amino-5-nitrothiazole, 2 - amino-5 - cyanothiazole, 2-amino - 4 - methyl - 5 - nitrothiazole, 2 - amino - 4 - methylthiazole, 2 - amino - 4 - phenylthiazole, 2 - amino - 4 - (4' - chloro) - phenylthiazile, 2 amino - 4 - (4' - nitro) - phenylthiazole, 2 - amino-6-chlorobenzthiazole, 2 - amino - 6 - nitrobenzthiazole, 2-amino - 1,3,4 - thiadiazole and 2 - amino - 1,3,5-thiadiazole.

The coupling components which may be used in the process of the invention preferably correspond to the formula

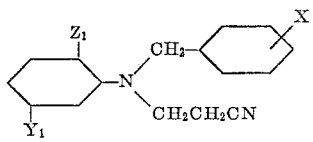

in which X, $Y_1$ and $Z_1$ have the meanings given above. The following amines may be mentioned as examples:
N-benzyl-N-β-cyanoethylaniline,
N-(para-methylbenzyl)-N-cyanoethylaniline,
N-(para-chlorobenzyl)-N-cyanoethylaniline,
N-(para-methoxybenzyl)-N-cyanoethylaniline,
N-(orthomethylbenzyl)-N-cyanoethylaniline,
N-benzyl-N-β-carbamidoethylaniline,
N-benzyl-N-β-carbomethoxyethylaniline,
N-benzyl-N-β-carbethoxyethylaniline,
N-benzyl-N-β-cyanoethoxyethylaniline,
1-(N-benzyl-N-β-cyanoethylamino)-3-methylbenzene,
1-(N-benzyl-N-β-cyanoethylamino)-3-chlorobenzene,
1-(N-benzyl-N-β-cyanoethylamino)-3-methyl-6-methoxybenzene,
N-(meta-methylbenzyl)-N-cyanoethylaniline,
1-(N-benzyl-N-β-cyanoethylamino)-3-acetylaminobenzene,
1-(N-benzyl-N-β-cyanoethylamino)-3-propionylaminobenzene and
1-(N-benzyl-N-β-cyanoethylamino)-3-acetylamino-6-methoxybenzene.

Diazotization of the above-mentioned diazo components can be effected by known methods, for example, with the aid of a mineral acid, especially hydrochloric acid, and sodium nitrite or, for example, with a solution of nitrosylsulfuric acid in concentrated sulfuric acid.

Coupling can also be effected in known manner, for example, in a neutral to acid medium, if necessary, in the presence of sodium acetate or some other buffer having an influence on the rate of coupling, or a catalyst, for example, pyridine, or a salt thereof.

After the coupling reaction the dyestuffs formed can easily be separated from the coupling mixture, for example, by filtration, because tey are practically insoluble in water.

The new dyestuffs are eminently suitable for dyeing and printing structures, especially fibers and fabrics made, for example, for cellulose triacetate and polyamides, but especially from aromatic polyesters. Dyeings possessing excellent properties of fastness, especially fastness to light, sublimation and rubbing, are thereby obtained.

For dyeing, the new dyestuffs are advantageously used in a state of fine division and dyeing is carried out in the presence of a dispersing agent, for example, soap, sulphite, cellulose waste liquor or a synthetic detergent or a combination of different wetting and dispersing agents. Prior to dyeing it is generally advantageous to convert the dyestuffs into a dyeing preparation which contains a dispersing agent and a finely divided dyestuff in a form such that a fine dispersion is formed when the preparations can be made in known manner, for example, by precipitating the dyestuff from a solution in sulfuric acid and grinding the suspension so obtained with sulphite cellulose waste liquor or, if necessary, by grinding the dyestuff in the dry or wet state in a highly efficient grinding device in the presence or absence of a dispersing agent.

In order to obtain stronger dyeings on polyethylene terephatalate fibers it is advantageous to add a swelling agent to the dyebath or, in particular, to carry out the dyeing process under superatmospheric pressure at a temperature above 100° C., for example, at 120° C. Suitable swelling agents are aromatic carboxylic acids, for example, benzoic acid or salicylic acid, phenols, for example, ortho- or para-hydroxydiphenyl, aromatic halogenated compounds, for example, chlorobenzene, ortho-dichlorobenzene or trichlorobenzenes, phenylmethylcarbinol or diphenyl. When carrying out the dyeing process under superatmospheric pressure it is advantageous to render the dyebath slightly acid, for example, by the addition of a weak acid, for example, acetic acid.

By virtue of their fastness to alkali the new dyestuffs are also suitable for application by the so-called thermofixation process in which the fabric to be dyed is impregnated at a temperature not exceeding 60° C. with an aqueous dispersion of the dyestuff which advantageously contains 1 to 50% of urea and a thickening agent, preferably sodium alginate, and is then squeezed in the usual manner. Squeezing is advantageously effected in a manner such that the impregnated material retains 50 to 100% of its dry weight of dye liquor.

To bring about fixation of the dyestuff the impregnated fabric is heated to a temperature above 100° C., for example, to a temperature between 180 to 220° C., this operation advantageously being carried out subsequent to a drying process, for example, by exposing the fabric to a current of hot air.

The thermofixation process is specially suitable for the dyeing of union fabrics containing polyester and cellulosic fibers, especially cotton. When dyeing material of this nature the padding liquor contains a dyestuff of the invention and also a dyestuff suitable for dyeing cotton, especially a vat dyestuff or a reactive dyestuff, that is to say, a dyestuff that can be fixed to a cellulosic fiber by a chemical bond, for example, a dyestuff containing a chlorotriazine radical or a chlorodiazine radical. When working with reactive dyestuffs it is advantageous to add a substance capable of binding acid to the padding liquor, for example, an alkali metal carbonate, an alkali liquor, for example, an alkali metal carbonate, an alkali metal phosphate, an alkali metal borate or perborate or mixtures of such substances. When using vat dyestuffs the padded fabric has to be treated with an aqueous alkaline solution of one of the reducing agents commonly used in vat dyeing after it has been subjected to the heat treatment.

By reason of the fact that the dyestuffs of the invention reserve woll well they are very suitable for use in the dyeing of union fabrics made from polyester fibers and wool.

The dyeings obtained are advantageously subjected to an after treatment, for example, by heating with an aqueous solution of a non-ionic detergent.

The dyestuffs of the invention can also be applied by printing techniques. In this method of application a printing paste is used that contains, in addition to the usual printing assistants e.g. wetting and thickening agents, the finely divided dyestuff, if necessary, in admixture with the above-mentioned cotton dyestuffs and, if necessary, urea and/or an agent capable of binding acid.

The following examples illustrate the invention. Unless otherwise stated, the parts and percentages are by weight.

EXAMPLE 1

5.2 parts of sodium nitrite were dissolved in 103 parts of sulfuric acid monohydrate. 12.3 parts of 1-amino-2- cyano-4-nitrobenzene were added and the whole well mixed. After some time the solution was discharged into 450 parts of ice-water. The diazo solution so obtained was added to a solution of 17.7 parts of N-cyanoethyl-N-benzylaniline in 450 parts of acetone. Coupling was completed by the addition of sodium acetate solution. The precipitated product was isolated by filtration, suspended in water, the suspension rendered slightly alkaline by the addition of sodium carbonate solution, filtered, and the filter residue washed with water. The dyestuff so obtained dyed polyester fibers red tints possessing excellent properties of fastness when applied in the form of an aqueous dispersion. When polyester slubbing was dyed in an enclosed circulating liquor machine, the dyeings obtained were distinguished by a good fastness to rubbing.

EXAMPLES 2 to 39

Further dyestuffs were obtainable by diazotizing the diazo components listed in the second column of the following table in the manner indicated in Example 1 and coupling the diazo compound with the appropriate coupling component listed in the third column. The fourth column shows the tints obtainable on polyester fibers with the dyestuffs so prepared.

| Number | Diazo component | Coupling component | Dying |
|---|---|---|---|
| 2 | $O_2N$–C$_6$H$_3$(CN)–$NH_2$ (2-CN, 4-$NO_2$ aniline) | 3-methyl-N-ethyl-N-benzylaniline | Red. |
| 3 | $O_2N$–C$_6$H$_3$(CN)–$NH_2$ | 3-methoxy-N-($C_2H_4CN$)-N-benzylaniline | Ruby. |
| 4 | $O_2N$–C$_6$H$_3$(CN)–$NH_2$ | 3-$NHCOCH_3$-N-($C_2H_4CN$)-N-benzylaniline | Do. |
| 5 | $O_2N$–C$_6$H$_3$(CN)–$NH_2$ | 2-$OCH_3$-5-$CH_3$-N-($C_2H_4CN$)-N-benzylaniline | Violet. |
| 6 | $O_2N$–C$_6$H$_3$(CN)–$NH_2$ | 3-Cl-N-($C_2H_4CN$)-N-benzylaniline | Ruby. |
| 7 | $O_2N$–C$_6$H$_3$(CN)–$NH_2$ | N-($C_2H_4CN$)-N-(4-methylbenzyl)aniline | Red. |
| 8 | $O_2N$–C$_6$H$_3$(CN)–$NH_2$ | N-($C_2H_4CN$)-N-(4-methoxybenzyl)aniline | Red. |
| 9 | $O_2N$–C$_6$H$_3$(CN)–$NH_2$ | N-($C_2H_4CN$)-N-(2-chlorobenzyl)aniline | Red. |
| 10 | $O_2N$–C$_6$H$_3$(CN)–$NH_2$ | N-($C_2H_4CONH_2$)-N-(4-methoxybenzyl)aniline | Ruby. |
| 11 | $O_2N$–C$_6$H$_3$(CN)–$NH_2$ | N-($C_2H_4COOC_2H_5$)-N-benzylaniline | Red. |
| 12 | $O_2N$–C$_6$H$_3$(CN)–$NH_2$ | N-($C_2H_4OC_2H_4CN$)-N-benzylaniline | Ruby. |

| Number | Diazo component | Coupling component | Dying |
|---|---|---|---|
| 13 | 2-amino-5-nitrothiazole ($O_2N$–thiazole–$NH_2$) | N-benzyl-N-(2-cyanoethyl)aniline | Red-violet. |
| 14 | 2-amino-5-nitrothiazole | N-benzyl-N-(2-cyanoethyl)-3-acetamidoaniline ($NHCOCH_3$) | Bluish-violet. |
| 15 | 2,6-dichloro-4-nitroaniline | N-benzyl-N-(2-cyanoethyl)aniline | Brown. |
| 16 | 2-cyano-4-nitroaniline | N-(2-phenylethyl)-N-(2-cyanoethyl)aniline | Red. |
| 17 | 2-methylsulfonyl-4-nitroaniline ($SO_2CH_3$) | N-benzyl-N-(2-cyanoethyl)aniline | Red. |
| 18 | 2,4-dinitro-5-chloroaniline | N-benzyl-N-(2-cyanoethyl)aniline | Red-brown. |
| 19 | 2,4-dinitroaniline | N-benzyl-N-(2-cyanoethyl)aniline | Scarlet. |
| 20 | 2-cyano-4-nitro-6-chloroaniline | N-benzyl-N-(2-cyanoethyl)aniline | Ruby. |
| 21 | 2-chloro-4-methylsulfonylaniline ($CH_3O_2S$–, Cl) | N-benzyl-N-(2-cyanoethyl)aniline | Orange. |
| 22 | methyl 4-aminobenzoate ($CH_3OOC$–) | N-benzyl-N-(2-cyanoethyl)aniline | Yellow. |
| 23 | 2-chloro-4-nitroaniline | N-benzyl-N-(2-cyanoethyl)aniline | Scarlet. |
| 24 | 2-chloro-4-nitroaniline | N-(2-chlorobenzyl)-N-(2-cyanoethyl)aniline | Do. |
| 25 | 2-trifluoromethylaniline ($CF_3$) | N-benzyl-N-(2-cyanoethyl)aniline | Yellow. |
| 26 | 2-amino-6-methylsulfonylbenzothiazole ($CH_3O_2S$–benzothiazole–$NH_2$) | N-benzyl-N-(2-cyanoethyl)aniline | Orange. |

| Number | Diazo component | Coupling component | Dying |
|---|---|---|---|
| 27 | $H_5C_2O$—[benzothiazole]—$NH_2$ | [phenyl]—N(—$CH_2$—[phenyl])(—$C_2H_4CN$) | Do. |
| 28 | [thiazole]—$NH_2$ | [phenyl]—N(—$CH_2$—[phenyl])(—$C_2H_4CN$) | Do. |
| 29 | $O_2N$—[phenyl(OCH$_3$)]—$NH_2$ | [phenyl]—N(—$CH_2$—[phenyl])(—$C_2H_4CN$) | Do. |
| 30 | $CH_3$-[thiadiazole]—$NH_2$ | [phenyl]—N(—$CH_2$—[phenyl])(—$C_2H_4CN$) | Do. |
| 31 | [phenyl]-[thiazole]—$NH_2$ | [phenyl]—N(—$CH_2$—[phenyl])(—$C_2H_4CN$) | Scarlet. |
| 32 | $NC$—[phenyl(CN)]—$NH_2$ | [phenyl]—N(—$CH_2$—[phenyl])(—$C_2H_4CN$) | Do. |
| 33 | [phenyl(CN)(CN)]—$NH_2$ | [phenyl]—N(—$CH_2$—[phenyl])(—$C_2H_4CN$) | Orange. |
| 34 | $NC$—[thiazole]—$NH_2$ | [phenyl]—N(—$CH_2$—[phenyl])(—$C_2H_4CN$) | Claret. |
| 35 | $O_2N$—[phenyl(COOCH$_3$)]—$NH_2$ | [phenyl]—N(—$CH_2$—[phenyl])(—$C_2H_4CN$) | Red. |
| 36 | $O_2N$—[phenyl(NO$_2$)(Cl)]—$NH_2$ | [phenyl(OCH$_3$)(NHCOCH$_2$CH$_3$)]—N(—$CH_2$—[phenyl])(—$C_2H_4OC_2H_4CN$) | Blue. |
| 37 | $O_2N$—[phenyl(Cl)]—$NH_2$ | [phenyl]—N(—$CH_2$—[phenyl])(—$C_2H_4OC_2H_4CN$) | Red. |
| 38 | $NC$—[benzothiazole]—$NH_2$ | [phenyl]—N(—$CH_2$—[phenyl])(—$C_2H_4CN$) | Red. |
| 39 | $O_2N$—[benzothiazole]—$NH_2$ | [phenyl]—N(—$CH_2$—[phenyl])(—$C_2H_4CN$) | Red. |

Dyeing prescription I 1 part of the dyestuff obtained in the manner described in Example 1 was ground in the wet state together with 2 parts of a 50% aqueous solution of sulphite cellulose waste liquor and the mixture was then dried.

The dyestuff preparation so obtained was admixed with 40 parts of a 10% aqueous solution of a condensation product obtained from octadecyl alcohol and 20 mols of ethylene oxide, and then 4 parts of a 40% acetic acid solution were added. A dyebath of 4,000 parts was prepared by dilution with water.

100 parts of a cleaned polyester fiber material were entered in the dyebath so prepared at 50° C., the temperature raised to 120 to 130° C. during 30 minutes, and dyeing carried out in the closed vessel for one hour at that temperature. The material was then well rinsed. A strong red dyeing possessing an excellent fastness to light and to sublimation was obtained.

Dyeing prescription II 200 parts of an aqueous dispersion containing 20 parts of the dyestuff of Example 2 and 2 parts of the sodium salt of diisobutylnaphthalene sulfonic acid were poured into a solution of 50 parts of urea in 100 parts of water and the whole well stirred for a few minutes by means of a high-speed stirrer, during which process 100 parts of a 20% sodium carbonate solution, 100 parts of a 5% sodium alginate solution and 450 parts of water were added.

A polyethylene terephthalate fabric was padded at 50 to 60° C. with the padding liquor so prepared, the degree of squeezing being such that it retained 66 to 70% of its dry weight of padding liquor. The material was then dried and subjected to a heat treatment for one minute at 200 to 220° C.

Subsequently, the material was washed for 20 minutes at the boil in a solution containing 2 grams per liter of a non-ionic detergent and 2 grams per liter of anhydrous sodium carbonate. A red dyeing having very good properties of fastness was obtained.

Printing prescription

A mixture was prepared from the following, using a high-speed stirrer:

|  | Parts |
|---|---|
| 10% aqueous paste of the dyestuff of Example 4 | 60 |
| Water | 290 |
| 5% aqueous sodium alginate solution | 550 |
| 10% solution of the sodium salt of diisobutylnaphthalene sulfonic acid | 50 |
| Mixture of potassium oleate and pine oil | 50 |
|  | 1000 |

A polyester fabric was printed with the printing paste so obtained. After printing, the fabric was dried and then subjected to a heat treatment for one minute at 200 to 220° C.

Subsequently, the material was rinsed, washed at the boil in a solution containing per liter of water 2 grams of the condensation product obtained from 9 mols of ethylene exide and 1 mol of nonyl phenol, rinsed and dried. A ruby print possessing very good properties of fastness was obtained.

What is claimed is:

1. A water-insoluble monoazo-dyestuff of the formula $$A-N=N-\underset{Y_1}{\underset{|}{\overset{Z_1}{\overset{|}{\bigcirc}}}}-N\underset{CH_2CH_2CN}{\overset{(CH_2)_n-\bigcirc-X}{\diagup}}$$

in which $Z_1$ represents a hydrogen atom or an alkoxy group having 1-2 carbon atoms, $Y_1$ represents hydrogen, chlorine or bromine or alkyl or alkoxy having 1-2 carbon atoms or lower alkanoylamino, X represents hydrogen or halogen or alkyl or alkoxy having 1-2 carbon atoms, $n$ represents the number 1 or 2, A is a member selected from the group consisting of the radicals of the formulae $$\underset{X_1-C\diagdown_S\diagup C-}{\overset{HC---N}{\overset{\|}{}}}, \quad \underset{X_3-\bigcirc\diagdown_S\diagup}{\overset{N}{\diagdown}}C-, \quad \underset{N\diagdown_S\diagup C-}{\overset{R-C---N}{\overset{\|}{}}}$$

and $$O_2N-\underset{Z}{\underset{|}{\overset{Y}{\overset{|}{\bigcirc}}}}-$$

in which formulae $X_1$ represents hydrogen, nitro or cyano, $X_2$ represents methylsulfonyl, ethoxy, cyano or nitro, R represents methyl or phenyl, Y represents hydrogen or halogen or lower alkyl, lower alkoxy, nitro, cyano, carbon-lower alkoxy or lower alkylsulfone, Z represents hydrogen, chlorine, bromine or lower alkyl, cyano or trifluoromethyl.

2. A water-insoluble monoazo-dyestuff of the formula $$O_2N-\bigcirc-\underset{CN}{\underset{|}{\bigcirc}}-N=N-\underset{Y_1}{\underset{|}{\overset{Z_1}{\overset{|}{\bigcirc}}}}-N\underset{CH_2CH_2CN}{\overset{(CH_2)_n-\bigcirc-X}{\diagup}}$$

in which X represents a hydrogen or chlorine atom or an alkyl or alkoxy group having 1–2 carbon atoms, $Y_1$ represents a hydrogen or chlorine atom or alkyl or alkoxy having 1–2 carbon atoms, or lower alkanoylamino, $Z_1$ represents hydrogen or alkoxy having 1–2 carbon atoms and $n$ is the number 1 or 2.

3. The dyestuff of the formula $$O_2N-\bigcirc-\underset{CN}{\underset{|}{\bigcirc}}-N=N-\bigcirc-N\underset{C_2H_4CN}{\overset{CH_2-\bigcirc}{\diagup}}$$

in which X represents a hydrogen or chlorine atom or an alkyl or alkoxy group, $Y_1$ represents a hydrogen or chlorine atom or an alkyl, alkoxy or lower alkanoylamino group, $Z_1$ represents a hydrogen atom or an alkoxy group and $n$ is the number 1 or 2.

4. The dyestuff of the formula $$O_2N-\bigcirc-\underset{CN}{\underset{|}{\bigcirc}}-N=N-\bigcirc-N\underset{C_2H_4CN}{\overset{CH_2-\bigcirc-Cl}{\diagup}}$$

5. The dyestuff of the formula $$O_2N-\bigcirc-\underset{CN}{\underset{|}{\bigcirc}}-N=N-\bigcirc-N\underset{C_2H_4CN}{\overset{CH_2-\bigcirc-CH_3}{\diagup}}$$

6. The dyestuff of the formula $$O_2N-\bigcirc-\underset{CN}{\underset{|}{\bigcirc}}-N=N-\bigcirc-\underset{CH_3}{\underset{|}{N}}\underset{C_2H_4CN}{\overset{CH_2-\bigcirc}{\diagup}}$$

7. The dyestuff of the formula $$O_2N-\underset{S}{\overset{N}{\diagdown}}-N=N-\underset{NHCOCH_3}{\underset{|}{\bigcirc}}-N\underset{C_2H_4CN}{\overset{CH_2-\bigcirc}{\diagup}}$$

8. The compound of the formula $$O_2N-\bigcirc-\underset{CN}{\underset{|}{\bigcirc}}-N=N-\bigcirc-N\underset{CH_2CH_2CN}{\overset{CH_2CH_2-\bigcirc}{\diagup}}$$

(References on following page)

References Cited

UNITED STATES PATENTS

| | | | |
|---|---|---|---|
| 2,109,024 | 2/1938 | Holzach et al. | 260—205 |
| 3,132,132 | 5/1964 | Suzuki et al. | 260—158 |
| 3,154,034 | 10/1964 | Liechti | 260—205 |
| 1,757,419 | 5/1930 | Duisberg et al. | 260—205 X |
| 2,173,417 | 10/1939 | Huber | 260—205 X |

FLOYD D. HIGEL, Primary Examiner

U.S. Cl. X.R.

8—41, 50, 63, 71; 260—205, 206, 207, 207.1, 465

UNITED STATES PATENT OFFICE
CERTIFICATE OF CORRECTION

Patent No. 3,483,180      Dated December 9, 1969

Inventor(s) VISVANATHAN RAMANATHAN

It is certified that error appears in the above-identified patent and that said Letters Patent are hereby corrected as shown below:

Column 11, lines 71-75, amend the left hand side of the second formula to read:

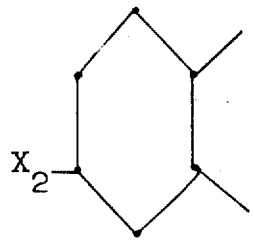

Column 12, lines 35-39, delete "in which X represents a hydrogen or chlorine atom or an alkyl or alkoxy group, $Y_1$ represents a hydrogen or chlorine atom or an alkyl, alkoxy or lower alkanoylamino group, $Z_1$ represents a hydrogen atom or an alkoxy group and n is the number 1 or 2."

Column 12, lines 50-54, amend the center portion of the formula to read:

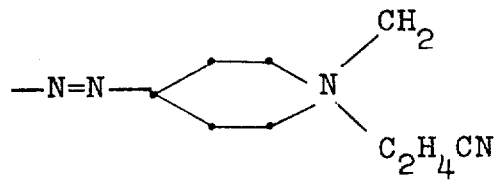

Page 1 of 2

UNITED STATES PATENT OFFICE
CERTIFICATE OF CORRECTION

Patent No. 3,483,180    Dated December 9, 1969

Inventor(s) VISVANATHAN RAMANATHAN

It is certified that error appears in the above-identified patent and that said Letters Patent are hereby corrected as shown below:

Column 12, lines 70-75, amend the left hand side of the formula to read:

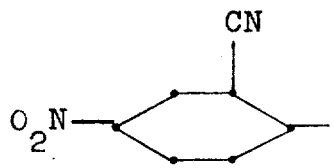

Signed and sealed this 17th day of August 1971.

(SEAL)
Attest:

EDWARD M. FLETCHER, JR.
Attesting Officer

WILLIAM E. SCHUYLER, JR.
Commissioner of Patents